W. V. TURNER.
FLUID PRESSURE BRAKE.
APPLICATION FILED APR. 17, 1917.
1,297,512. Patented Mar. 18, 1919.
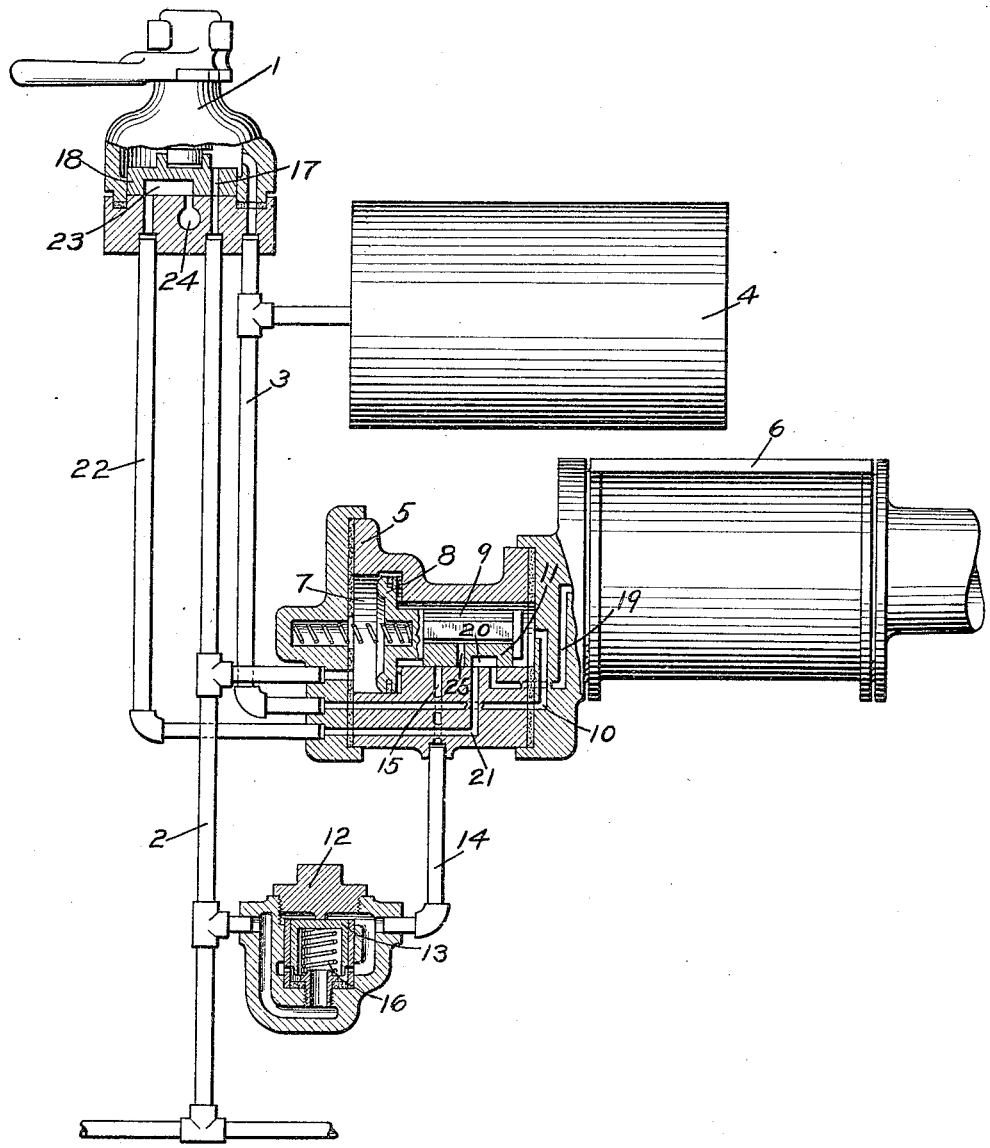
INVENTOR-
Walter V. Turner
by Wm. M. Cady
Att'y.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

1,297,512.         Specification of Letters Patent.    Patented Mar. 18, 1919.

Application filed April 17, 1917. Serial No. 162,679.

*To all whom it may concern:*

Be it known that I, WALTER V. TURNER, a citizen of the United States, residing at Wilkinsburg, in the county of Allegheny and State of Pennsylvania, have invented new and useful Improvements in Fluid-Pressure Brakes, of which the following is a specification.

This invention relates to fluid pressure brakes, and more particularly to a straight air emergency brake equipment.

With equipments of the above character, the brake pipe is charged with fluid under pressure through a small port in the brake valve, this port being made small, so that there will not be a serious loss of fluid from the main reservoir in case of a break-in-two, and in order to prevent such a flow of fluid to the brake pipe as might interfere with obtaining an emergency rate of reduction in brake pipe pressure when the same is initiated by means other than the brake valve, such as by a conductor's valve.

The use of a small port, however, will not permit of releasing the brakes quickly, since the brake pipe pressure can not be rapidly increased through the small port after an application of the brakes.

The principal object of my invention is to provide means for effecting the quick release of the brakes while employing the restricted port in the brake valve.

In the accompanying drawing, the single figure is a diagrammatic view, partly in section, of a straight air emergency brake equipment embodying my invention.

As shown in the drawing, the equipment may comprise a brake valve 1 connected to brake pipe 2, and by pipe 3 to a main reservoir 4, an emergency valve device 5, and a brake cylinder 6.

The emergency valve device 5 may comprise a casing having a piston chamber 7 connected to the brake pipe 2 and containing piston 8 and a valve chamber 9 connected by passage 10 to main reservoir pipe 3 and containing a slide valve 11.

According to my invention, a valve device 12 is provided, comprising a casing containing a valve piston 13, having one face connected to a pipe 14 and passage 15 leading to the seat of slide valve 11 and the other face connected to the brake pipe 2 and subject to the pressure of a spring 16.

In the release position of the brake valve 1, fluid is supplied from the main reservoir to the brake pipe 2 through a restricted port 17 in the rotary valve 18 and the brake cylinder is connected to the exhaust through passage 19, cavity 20 in slide valve 11, passage 21, straight air pipe 22, cavity 23 in the rotary valve 18 and the exhaust port 24.

A straight air application of the brakes may be effected in the usual manner by turning the brake valve to straight air application position, in which fluid is supplied by the brake valve through the straight air pipe 22 to the brake cylinder.

If a sudden reduction in brake pipe pressure is made, the emergency piston 8 will be shifted to emergency position and fluid will be supplied to the brake cylinder from valve chamber 9 and the main reservoir through passage 19.

In the emergency position of slide valve 11, a port 25 registers with passage 15, so that fluid from the main reservoir is supplied to one face of the valve piston 13 and since the brake pipe pressure on the opposite face thereof has been reduced, the valve piston will be shifted against the resistance of spring 16, so as to seat and cut off communication from pipe 14 to brake pipe 2.

When it is desired to release the brakes, the brake valve is turned to release position, and fluid is then supplied to the brake pipe through the restricted port 17. Upon an increase in brake pipe pressure to a predetermined low degree, the spring 16, acting with the increased brake pipe pressure, overcomes the main reservoir pressure on the opposite side of the valve piston 13, so that the same is shifted to open communication from pipe 14 to the brake pipe 2. Fluid is now supplied from the valve chamber 9 and the main reservoir directly to the brake pipe, thus insuring the rapid increase in brake pipe pressure and the quick release of the brakes.

Having now described my invention, what I claim as new and desire to secure by Letters Patent, is:

1. In a fluid pressure brake, the combination with a source of fluid under pressure and a brake pipe, of a valve device subject to the opposing pressures of said source and the brake pipe and operated upon a predetermined increase in brake pipe pressure for supplying fluid from said source to the brake pipe.

2. In a fluid pressure brake, the combination with a brake pipe, a source of fluid under pressure, and a valve device operated upon a reduction in brake pipe pressure for effecting an application of the brakes, of means operated upon an increase in brake pipe pressure for supplying fluid from said source through a port controlled by said valve device to the brake pipe.

3. In a fluid pressure brake, the combination with a brake pipe and a source of fluid under pressure, of means operated upon an increase in brake pipe pressure for supplying fluid to the brake pipe and a valve device operated upon a reduction in brake pipe pressure for effecting an application of the brakes and for opening communication through which fluid is supplied from said source to said means.

4. In a fluid pressure brake, the combination with a brake pipe and a source of fluid under pressure, of a valve piston operated upon an increase in brake pipe pressure for supplying fluid from said source to the brake pipe and an emergency valve device adapted in emergency application position to open communication through which fluid from said source is supplied to said valve piston.

In testimony whereof I have hereunto set my hand.

WALTER V. TURNER.

Copies of this patent may be obtained for five cents each, by addressing the "Commissioner of Patents, Washington, D. C."